United States Patent Office 2,829,119
Patented Apr. 1, 1958

2,829,119

COMPOSITION COMPRISING A COPOLYMER OF METHYLOL DIALLYLMELAMINE AND AN ORGANIC ESTER OF ACRYLIC ACID AND METHOD OF PREPARING

James R. Dudley and Pierrepont Adams, Darien, Conn., assignors to American Cyanamid Company, New York, N. Y., a corporation of Maine No Drawing. Application March 14, 1952
Serial No. 276,698

6 Claims. (Cl. 260—45.2)

This invention relates to the production of new materials having valuable and characteristic properties that make them especially suitable for use in industry, for example in molding, casting, coating, electrical insulating, and adhesive applications, and for other purposes. More particularly the invention is concerned with polymerizable compositions comprising an aldehyde-reaction product of an N-substituted melamine and with polymerization products thereof, and specifically such compositions which comprise polymerizable products of reaction of ingredients comprising (1) an aldehyde (including polymeric aldehydes, hydroxyaldehydes and aldehyde-addition products) and (2) a compound represented by the general formula I 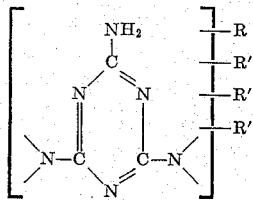

where R represents an ethylenically unsaturated hydrocarbon radical containing from 3 to 4 carbon atoms, inclusive, and R' represents a member of the class consisting of hydrogen, ethylenically unsaturated hydrocarbon radicals having the same meaning as R, and alkyl, cycloalkyl, aryl, alkaryl and aralkyl radicals. The polymerizable compositions may include the aforementioned aldehyde-reaction product alone or, also, one or more other substances which are different therefrom and copolymerizable therewith, e. g., an unsaturated alkyd resin, a different compound containing a $CH_2=C<$ grouping, or both such an alkyd resin and said different compound containing a $CH_2=C<$ grouping, as well as other types of copolymerizable reactants. The scope of the invention includes homopolymers and copolymers produced from the aforementioned polymerizable compositions, as well as method features.

Illustrative examples of ethylenically unsaturated hydrocarbon radicals represented by R in Formula I are allyl, methallyl, propenyl, isopropenyl, 1-butenyl, crotyl (2-butenyl), 3-butenyl and 1,3-butadienyl. Illustrative examples of radicals represented by R' in Formula I are the aforementioned ethylenically unsaturated hydrocarbon radicals; alkyl (e. g., methyl, ethyl, propyl, isopropyl, sec.-butyl, pentyl, hexyl to dodecyl, etc.); cycloalkyl (e. g., cyclopentyl, cyclohexyl, cycloheptyl, etc.); aryl (e. g., phenyl, diphenyl or xenyl, naphthyl, etc.); alkaryl (e. g., tolyl, xylyl, ethylphenyl, propylphenyl, isopropylphenyl, tert.-butylphenyl, etc.); and aralkyl (e. g., benzyl, phenylethyl, phenylisopropyl, etc.).

The claims of the present application are directed specifically to polymerizable compositions comprising a methylol N,N-diallylmelamine, more particularly a dimethylol N,N-diallylmelamine, and an organic ester of acrylic acid, specifically methylisobutylcarbinyl acrylate; with compositions comprising a copolymer of copolymerizable ingredients including the aforementioned monomers; and with method features for preparing the latter compositions.

An example of an N-substituted melamine which is caused to react with an aldehyde, e. g., formaldehyde, in carrying the present invention into effect is N,N-diallylmelamine, the formula for which is II 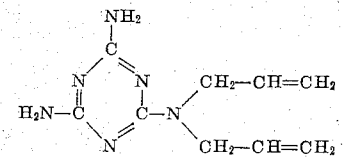

N,N-diallylmelamine is a preferred compound for use in practicing our invention. It is prepared by known methods, for instance by a method which is specifically described in Kaiser Patent No. 2,567,847, dated September 11, 1951. Other N-substituted triazines of the kind which are used in producing the aldehyde-reaction products of this invention can be produced by methods such as are given in, for example, the aforementioned Kaiser patent and in Patent No. 2,361,823, dated October 31, 1944.

Illustrative examples of N-substituted melamines embraced by Formula I, in addition to N,N-diallylmelamine, are:

N-allylmelamine
N-methallylmelamine
N,N'-diallylmelamine
N,N-dimethallylmelamine
N,N,N'-triallylmelamine
N,N,N',N'-tetrallylmelamine
N,N,N'-tri-(methallyl)melamine
N,N,N',N'-tetra-(methallyl)melamine
N-allyl-N-methylmelamine
N-allyl-N-benzylmelamine
N-allyl-N-tolylmelamine
N-allyl-N-phenylmelamine
N-allyl-N'-methylmelamine
N-allyl-N'-benzylmelamine
N-methallyl-N'-tolylmelamine
N-methallyl-N'-benzylmelamine
N,N-diallyl-N',N'-dimethylmelamine Other examples will be apparent to those skilled in the art from a consideration of Formula I and from the aforementioned illustrative examples of radicals represented by R and R' in that formula.

The present invention is based on our discovery that new synthetic materials having particular and peculiar properties that make them especially valuable for use in industry can be prepared as briefly described in the first paragraph of this specification and more fully hereinafter. The allyl or other ethylenically unsaturated hydrocarbon grouping or groupings attached to the amino nitrogen provide one or more additional points through which reaction can take place with other copolymerizable substances, and also impart to such N-substituted melamines better solubility characteristics and more basicity than melamine alone. The unsubstituted or partly substituted amino groupings containing hydrogen attached to the nitrogen atom thereof are reactive with aldehydes, e. g., formaldehyde. When the aldehyde is formaldehyde the corresponding monomethylol or polymethylol derivative is formed, and the methylol derivative then can be caused to condense with itself, e. g., by heating, to form a condensation polymer. This condensation polymerization can be caused to occur concurrently with a copolymerization reaction through the ethylenically unsaturated grouping of the compound or composition, e. g., by forming copolymers thereof with an unsaturated alkyd resin, e. g., diethylene glycol fumarate, ethylene glycol maleate sebacate, etc., a compound containing a $CH_2=C<$ grouping which is different from the N-substituted melamine, e. g., styrene, acrylonitrile, methyl, ethyl and other alkyl acrylates and methacrylates, etc. Combinations of these two types of reaction provide a large number of new and novel compositions which are useful as molding compounds, surface-coating materials (or as components thereof), ion-exchange resins, etc.

Taking N,N-diallylmelamine as illustrative of the compounds embraced by Formula I and formaldehyde as illustrative of the aldehyde, it may be mentioned that one mole of this compound will combine with one mole of neutral, aqueous formaldehyde in the absence of a catalyst to give a monomethylol derivative. When heated under conditions such that water is removed continuously, the product condenses with itself to give a thermoplastic linear polymer. The reaction of one mole of N,N-diallylmelamine with two or more moles of formaldehyde also occurs readily, preferably under alkaline conditions, to give a clear, water-soluble product. If this is then heated at an elevated temperature, e. g., at 125° C., a hard resin is produced that has some solubility in water-alcohol mixtures and in hot ethanol. When a lower alkyl alcohol, e. g., butanol, is added to the N,N-diallylmelamine-formaldehyde reaction product, resin solutions are formed which contain varying amounts of solids depending upon the ratio of the reactants and the pH of the solution. Additives such as polyhydric alcohols, e. g., glycerol, ethylene glycol, etc., and drying and semi-drying oils, e. g., tung oil, linseed oil, oiticica oil, menhaden oil, etc., are also useful for varying the physical properties of the resins.

N,N-diallylmelamine-formaldehyde resins, prepared in alkaline solution, have good compatibility with polyvinyl acetal or hydrolyzed polyvinylacetate plasticizers. The plasticized resins which may then be prepared are especially useful in surface-coating applications. The coatings are clear, light-colored and very resistant to crazing. The latter property is rather unusual for a resin of this type. These resins may be mixed with pigments to give a variety of light-colored surfaces, or the clear product may be impregnated into sheets of paper which are then used as the outside layers of a laminated article. Other types of resins are generally used as binders in this application, but the outside layer remains light in color even after being cured at 150° C. under a pressure of 1100 pounds per square inch. In making pulp pre-forms, the low water-solubility of the N,N-diallylmelamine-formaldehyde resin that is produced and used in this application prevents its being washed away from the pulp filler. The resin also imparts excellent flow characteristics to the molding compound.

Products having particular and valuable properties also are obtained when other N-substituted melamines of the kind embraced by Formula I are caused to react with formaldehyde and/or other aldehyde, or when N,N-diallylmelamine is caused to react with an aldehyde other than formaldehyde or with a mixture of formaldehyde and one or more other aldehydes.

In practicing our invention the initial condensation between the aldehyde and the N-substituted melamine may be carried out at normal or at an elevated temperature, at atmospheric, subatmospheric or superatmospheric pressure, and under neutral, alkaline or acid conditions. Any substance yielding an alkaline or an acid aqueous solution may be used in obtaining alkaline or acid conditions for the initial condensation reaction. For example, we may use an alkaline substance such as sodium, potassium or calcium hydroxide, sodium or potassium carbonate, a mono-, di- or triamine, etc. Illustrative examples of acid condensation catalysts that may be employed are inorganic or organic acids, e. g., hydrochloric, sulfuric, phosphoric, formic (which is normally present in the aqueous formaldehyde employed), acetic, lactic, acrylic, phthalic, maleic, etc., or acid salts such as sodium acid sulfate, monosodium phosphate, monosodium phthalate, etc. Mixtures of acids, of acid salts or of acids and acid salts may be employed if desired. Acid-addition salts of the N-substituted melamine can be used instead of the latter itself as the starting reactant with the aldehyde.

The reaction between the aldehyde, e. g., formaldehyde, and the N-substituted melamine may be carried out in the presence of solvents or diluents, other natural or synthetic bodies (numerous examples of which hereafter are given), or while admixed with other materials which are reactable or non-reactable with the aldehydic reactant or with the N-substituted melamine, e. g., urea, thiourea, cyanamide, dicyandiamide, phthalic diamide, acetamide, chlorinated acetamides, methyl ethyl ketone, etc.; aldehyde-reactable triazinyl compounds other than the N-substituted melamines used in practicing the present invention, e. g., melamine, ammeline, ammelide, etc.; phenol and substituted phenols, e. g., the cresols, the xylenols, the tert.-alkyl phenols, etc.; monohydric and polyhydric alcohols, e. g., butyl alcohol, amyl alcohol, heptyl alcohol, n-octyl alcohol, 2-ethylhexyl alcohol, ethylene glycol, propylene glycol, glycerol, polyvinyl alcohol, etc.; amines, including aromatic amines, e. g., aniline, etc.; and the like.

The modifying reactants may be incorporated with the aldehyde and the N-substituted melamine to form an intercondensation product by mixing all of the reactants and effecting condensation therebetween under acid, neutral or alkaline conditions or by various permutations of reactants. For example, we may effect partial reaction or condensation between the chosen aldehyde and the N-substituted melamine, then add the modifying reactant, e. g., urea, melamine, etc., and effect further condensation. Or, we may first partially react urea, melamine or other aldehyde-reactable modifying reactant with a molecular excess of an aldehyde under acid, alkaline or neutral conditions, then add the N-substituted melamine and effect further condensation. Or, we may separately partially react (1) urea, melamine or other aldehyde-reactable modifying reactant and an aldehyde and (2) an N-substituted melamine of the kind embraced by Formula I and an aldehyde, thereafter mixing the two products of partial reaction and effecting further reaction or condensation therebetween. The reactants of (1) and (2) may be partially condensed under acid, alkaline or neutral conditions.

In producing these new reaction products of an aldehyde and an N-substituted melamine of the kind embraced by Formula I, the choice of the aldehyde is dependent largely upon economic considerations and upon the particular properties desired in the finished product. We prefer to use as the aldehydic reactant formaldehyde or compounds engendering formaldehyde, e. g., paraformaldehyde, trioxane, hexamethylene tetramine, etc. Illustrative examples of other aldehydes that can be employed are acetaldehyde, propionaldehyde, butyraldehyde, heptaldehyde, octaldehyde, acrolein, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that can be used instead of the aldehydes themselves are the mono- and poly-(N-carbinol) derivatives, more particularly the mono- and polymethylol derivatives, of urea, thiourea and iminourea, and of substituted ureas, thioureas and iminoureas, mono- and poly-(N-carbinol) derivatives of amides of polycarboxylic acids, e. g., maleic, itaconic, fumaric, adipic, malonic, succinic, citric, phthalic, etc. Thus, instead of an aldehyde itself we can use, for example, a methylol urea, more particularly monomethylol urea or dimethylol urea or mixtures thereof, a methylol melamine, e. g., monomethylol melamine and polymethylol melamines (di-, tri-, tetra-, penta- and hexamethylol melamines). Mixtures of aldehydes and aldehyde-addition products can be employed, e. g., mixtures of formaldehyde and methylol compounds such, for instance, as dimethylol urea, trimethylol melamine, etc. When unsaturated aldehydes, e. g., acrolein, methacrolein, etc., are employed as the aldehydic reactant, they may co-react with the N-substituted melamine both through the —$NH_2$ grouping (or groupings) and through the —NRR' grouping (or groupings).

If desired, the reaction of the N-substituted melamine with the aldehyde may be carried out in the presence of substances which inhibit vinyl-type polymerization reactions, e. g., polyhydric phenols and aromatic amines. More specific examples of polymerization inhibitors that may be employed are hydroquinone, resorcinol, tannin, sym. di-(beta-naphthyl)-p-phenylene diamine, sulfur compounds, etc. The concentration of inhibitors, if used, is usually low, and less than about 1% by weight of the N-substituted melamine is generally sufficient, and it may be as low, in some cases, as from 0.01 to about 0.1%.

The ratio of the aldehydic reactant to the N-substituted melamine may be varied over a wide range depending, for example, upon the particular starting N-substituted melamine employed and the particular properties desired in the finished product. Thus, the amount of starting aldehyde, e. g., formaldehyde, may be, for example, as low as 0.5 mole of aldehyde per mol of N-substituted melamine to as high as 12 moles (or even higher) of aldehyde per mole of the N-substituted melamine. For certain applications of the aldehyde-reaction products, it is desirable that the combined molar ratios of N-substituted melamine to aldehyde be within the range of from about 1:1 to about 1:4, a preferred range being from about 1:1.5 to about 1:2.5. The reaction may be carried out over a wide range of pH conditions, as has been indicated hereinbefore, for example a pH of from about 4 to about 11, and more specifically a pH of from about 6 to about 9.

The temperature of the resin-forming condensation reaction should be sufficiently high to ensure dissolution of the initial reaction product in the solvent employed. Generally, this minimum temperature is of the order of 60° C. The practical upper limit of the reaction temperature is the reflux temperature of the mixture when the reaction is carried out at atmospheric pressure. If higher pressures are employed, the temperature may be increased but, in general, reaction temperatures above about 200° C. should be avoided. The preferred temperature range is usually from about 90° C. to about 105° C.

When the aldehyde-reaction product is to be used in the production of pulp pre-forms, the N-substituted melamine and the aldehyde, specifically formaldehyde, are caused to react at least to the point where, in finely powdered form, the reaction product will not coagulate or cake in water at about 20° C. This testing of the finely ground resin for absence of caking in water at 20° C. may be described as a "coagulation test," and the endpoint so determined as the "coagulation endpoint." Also, for pulp pre-form applications of the reaction or condensation product, the N-substituted melamine and the aldehyde should not be reacted beyond the point where the condensation product has a plasticity of about 60, as determined by the test described under Example 3.

The polymerizable aldehyde-reaction product may be used alone in such applications as have been mentioned hereinbefore, and then can be polymerized in situ to its ultimate form, with or without the aid of a polymerization catalyst, for instance an organic peroxide (e. g., benzoyl peroxide, acetyl peroxide, tert.-butyl hydroperoxide, etc.), an inorganic peroxide (e. g., hydrogen peroxide, etc.), a "redox" catalyst system (e. g., an ammonium persulfate-sodium metabisulfite system, etc.), and others which are known to the art. Or, in order to modify its properties and to widen the field of utility, it can be copolymerized with other substances which are different therefrom and copolymerizable therewith, e. g., compounds containing a $CH_2$=C< grouping which are different from the N-substituted melamine, unsaturated alkyd resins, mixtures of individual members of either or both of these classes of polymerizable unsaturated materials, as well as other copolymerizable substances.

The polymerization of the aldehyde-reaction product alone or while admixed with other unsaturated substances which are copolymerizable therewith is carried out by any of the various methods commonly used in effecting polymerization (including copolymerization) of other polymerizable and copolymerizable materials, for instance methods such as those described in Kropa Patent No. 2,510,503, dated June 6, 1950.

Illustrative examples of compounds that can be copolymerized with an aldehyde-reaction product of the compound embraced by Formula I are vinyl compounds, including the vinyl aromatic compounds, more particularly the vinyl aromatic hydrocarbons (e. g., styrene, isopropenyl toluene, the various dialkyl styrenes, etc.), other aliphatic compounds containing a $CH_2$=C< grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and N-substituted alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2$=C< grouping, more particularly a single $CH_2$=C< grouping.

Other examples of copolymerizable substances that can be employed alone or in conjunction with one or more compounds containing a $CH_2=C<$ grouping include the polymerizable unsaturated alkyd resins (modified or unmodified), e. g., ethylene glycol maleate, diethylene glycol maleate phthalate, ethylene glycol maleate succinate and diethylene glycol maleate linoleate. Other and more specific examples of unsaturated alkyd resins that can be used are given, for example, in Nyquist and Kropa Patent No. 2,503,209, dated April 4, 1950, and patents referred to therein (see, for instance, column 8, lines 1–64).

Still other examples of compounds that can be copolymerized with the aldehyde-reaction product of the compound embraced by Formula I are given in the aforesaid Kropa Patent No. 2,510,503 (e. g., column 2, line 46, to the end of the sentence in line 16, column 3; column 5, line 54, through line 46, column 7; and column 13, line 42, through line 30, column 16); and in the aforesaid Nyquist et al. Patent No. 2,503,209 (see, for instance, column 5, line 67, through line 75, column 7; and column 9, line 74, through line 12, column 11).

The unsaturated alkyd resins used in practicing the present invention contain a plurality of polymerizably reactive alpha, beta-enal groups,

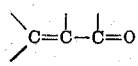

and are prepared in accordance with technique well known to those skilled in the resin art. Such resins are products of reaction of ingredients comprising a polyhydric alcohol and an unsaturated polycarboxylic acid, and are preferably produced by the esterification of an unsaturated alpha,beta-organic acid (or anhydride) of the aliphatic series, more particularly an unsaturated alpha,beta-polycarboxylic acid (or anhydride), with a polyhydric alcohol, for instance a glycol (e. g., diethylene glycol), glycerol, etc.

The proportions of the polymerizable aldehyde-reaction product and unsaturated material which is copolymerizable therewith may be widely varied depending, for instance, upon the particular starting materials employed and the particular properties desired in the copolymer, but usually are within the range of, by weight, from 1 to 5% of either to from 95 to 99% of the other, and more particularly from 10 to 15% of either to from 85 to 90% of the other. For the usual applications particularly good results are generally obtained with weight ratios of from 20:80 to 80:20. When the main function of the aldehyde-reaction product is to improve one or more specific properties of a substance which is copolymerizable therewith to form a copolymer, for example to improve the dyeability (especially toward acid dyes) of an acrylonitrile polymerization product, then the lower proportions of the aldehyde-reaction product are commonly employed, for instance weight ratios of aldehyde-reaction product and acrylonitrile (or equivalent monomer) of from about 1:20 of the former to about 99:80 of the latter.

In order that those skilled in the art may better understand how the present invention can be carried into effect, the following examples are given by way of illustration and not by way of limitation. All parts and percentages are by weight.

EXAMPLE 1

| | Parts |
|---|---|
| N,N-diallylmelamine | 412 |
| Aqueous formaldehyde (approx. 37% HCHO( previously adjusted to a pH of 7.5 with 10% aqueous NaOH) | 324 |
| Ethanol | 395 |

A mixture of the above ingredients is warmed until complete solution takes place, after which it is filtered and allowed to stand at room temperature for about 6 days. A crystalline product comprising a dimethylol N,N-diallylmelamine separates at the end of this period of time, and is filtered off and dried in a forced draft oven at 40° C. The yield of the dried product amounts to 194 parts. The filtrate is diluted with water, and from the diluted filtrate is obtained a further amount of crystalline material comprising a dimethylol N,N-diallylmelamine in a yield amounting to 171 parts, thereby bringing the total yield to 365 parts.

EXAMPLE 2

| | Parts |
|---|---|
| Dimethylol N,N-diallylmelamine (product of Example 1) | 11.5 |
| Methylisobutylcarbinyl acrylate | 35.0 |
| 2,2'-azo-bis-isobutyronitrile (polymerization catalyst) | 0.1 |
| Butanol | 46.5 | are heated together in a reaction vessel placed on a steam bath for 2 hours, yielding a solution of a copolymer of the said acrylate and dimethylol N,N-diallylmelamine and wherein further condensation of the latter probably has taken place through the dimethylol grouping. The maximum temperature of the reaction mass during the initial part of the polymerization period is 104° C. After cooling the butanol solution of the polymerization product, there is added thereto 0.5 part of phosphoric acid. This acidified solution is suitable for use as a coating composition, as evidenced by the fact that when a small sample of the solution is flowed onto a glass plate, followed by baking of the coated plate for 1 hour at 105° C., the resulting baked film is clear and hard.

EXAMPLE 3

| | Parts |
|---|---|
| N,N-diallylmelamine | 721 |
| Aqueous formaldehyde (approx. 37% HCHO) | 567 |

The N,N-diallylmelamine and aqueous formaldehyde are mixed together in a suitable reaction vessel, yielding a slurry which is adjusted to a pH of about 8 with a dilute solution of aqueous sodium hydroxide, e. g., about 1 part of 2 N aqueous sodium hydroxide. (In the above formulation the N,N-diallylmelamine and formaldehyde are employed in a ratio of approximately 1 mole of the former to 2 moles of the latter.) The alkaline slurry is brought to reflux temperature (about 98° C.) in about 35 minutes, and is then maintained at reflux for approximately 55 minutes. At the end of this period of time the solution of the reaction product of the formaldehyde and N,N-diallylmelamine becomes turbid and has a pH of about 8.5. After cooling the resulting reaction mass to about 65° to 66° C., it is concentrated under a pressure of about 240 mm. of mercury until the temperature of the reaction mass rises to about 120° C. Thereafter the pressure is decreased to about 160 mm. of mercury and the temperature is allowed to rise to about 140° C. over a period of approximately 50 minutes. The resulting formaldehyde-reaction product of the N,N-diallylmelamine is poured onto shallow trays, cooled and then ground prior to use. This material is a soluble, polymerizable, partial condensation product of an aldehyde, specifically formaldehyde, and N,N-diallylmelamine. It is particularly suitable for use in the production of pulp preforms, wherein the resin constitutes the binder for a filler material, e. g., a long-fibered cellulosic filler. For this purpose it is desirable that the condensation reaction between the formaldehyde and the N,N-diallylmelamine be continued to the point where a product is obtained which, after being finely powdered, will not cake in water at 20° C. The condensation reaction, when the resin is to be used for this purpose, should not be continued beyond the point where the product has a plasticity of about 60 as determined by the following test:

A charge of 50 grams of the material at 20°–30° C. is placed in the center of the bottom platen of a molding press, both platens of which are at a temperature of 290°±2° F. and which are so shaped and grooved as to produce a flat molded disc with concentric ridges ½" apart. The press is closed in 20 seconds and a force of 18 tons applied in 15 seconds and maintained during the cure time. At the end of the time required for cure, the piece is removed and cooled. The average measurement of the thickness taken in the ring about 2¼ inches from the center of the molded disc is recorded in mils as a measure of the plasticity.

EXAMPLE 4

|  | Parts |
|---|---|
| Methylisobutylcarbinyl acrylate | 187.5 |
| Dimethylol N,N-diallylmelamine (product of Example 1) | 62.5 |
| n-Butanol | 167.0 |
| Xylene | 83.0 |
| 2,2'-azo-bis-isobutyronitrile | 0.5 |

A mixture of the above ingredients is prepared in a suitable reaction vessel. One hundred (100) parts of this mixtture is heated to 85° C. in another reaction vessel placed on a steam bath, at which temperature the solution becomes clear. The copolymerization reaction between the said acrylate and dimethylol N,N-diallylmelamine becomes exothermic when the temperature reaches 95° C., thereafter rising to 105° C. At this higher temperature the remainder of the mixture of starting materials is added over a period of 20 minutes. The maximum temperature attained during this period, without cooling, is 115° C. After all of the mixture has been added to the reaction vessel, the resulting mass is heated on a steam bath for two hours. The resulting solution of the copolymer is cooled and then filtered, while admixed with diatomoceous earth, to yield a clear solution which is suitable for use as a coating composition.

EXAMPLE 5

An unalkylated resinous reaction product of formaldehyde and N,N-diallylmelamine is prepared by charging N,N-diallylmelamine and an aqueous solution of formaldehyde (approx. 37% HCHO) to a suitable reaction vessel, these reactants being employed in a ratio of 1 mole of N,N-diallylmelamine to 3 moles of formaldehyde. The resulting mixture is heated to 60° C. and maintained at that temperature until the solution is clear, after which heating is continued under vacuum for the removal of water up to a temperature of 125° C. Upon cooling, there is obtained a hard resin which is soluble in a mixture of water and alcohol as well as in a mixture of water and acetone, but which is insoluble in mineral spirits and in water. At approximately equal parts of resin and solvent it is soluble in butanol, hot xylene, hot ethanol and a hot mixture of equal parts of ethanol and xylene.

EXAMPLE 6

This example illustrates the prepartion of an alkylated, specifically butylated, resinous reaction product of N,N-diallylmelamine and formaldehyde.

|  | Parts |
|---|---|
| N,N-diallylmelamine | 103 |
| Aqueous formaldehyde (approx. 37% HCHO) | 120 |
| Butanol (n-butanol) | 75 |
| Xylene | 50 |

All of the above ingredients are charged to a 3-necked reaction vessel equipped with a thermometer, stirrer and reflux condenser, and are then heated to reflux temperature over a decanter. The decanter permits the continuous withdrawal of condensed water and the continuous return of condensed organic liquids to the reaction vessel. Refluxing starts at a batch temperature of 91° C. and a vapor temperature of 88° C. The reaction, which is carried out under acidic conditions since no alkali is added to neutralize the normally acidic formaldehyde, is continued to a batch temperature of 120° C. and a vapor temperature of 97.5° C., at which point approximately 74 parts of lower aqueous layer has been removed from the decanter. The yield of the batch amounts to 257 parts. Diatomaceous earth is added and the solution is then filtered. The filtered solution contains about 41.6% of solids and has an acid number of less than 1.

The butylated N,N-diallylmelamine-formaldehyde reaction product of this example is suitable for use in various liquid coating compositions, e. g., white baking enamels. A typical formulation for making such an enamel is as follows:

|  | Parts |
|---|---|
| Titanium dioxide | 100 |
| Alkyd resin solution [1] | 70 |
| Resinous reaction product of Example 6 (based on resin solids content) | 30 |

[1] NOTE: Xylene solution of a glyceryl phthalate polyester modified with fatty acids of soya bean oil.

The above enamel is reduced with xylene to a viscosity of 60 seconds at 25° C. using a Ford cup No. 4, and prior to use by spraying is further thinned to a viscosity of 21 seconds by adding more solvent. Good coatings are obtained by spraying the enamel both on bonderized and bare steel, after which it is air-dried for 15 minutes and then baked for 30 minutes at 300° F. In general, the cured films have a good gloss and flexibility, as well as good resistance to attack by soap and alkali and to abrasion, e. g., resistance to scratching by a sharp implement such as a knife.

EXAMPLE 7

Exactly the same formulation is employed as in Example 6 with the exception that there is also added to the reaction mixture 0.5 part of phthalic anhydride. The procedure also is essentially the same as in the preceding example, the reaction being completed when the batch temperature reaches 125° C. and the vapor temperature is 107° C. During the course of the reaction there is removed approximately 96 parts of aqueous layer from the lower part of the decanter. The yield amounts to about 248 parts. The solution is filtered as described under Example 6, the filtered solution containing about 60.5 parts of resin solids and having an acid number of 1.4. The solution of the butylated N,N-diallylmelamine-formaldehyde reaction product of this example is more viscous than the product of the preceding example. When tested in a white baking enamel as described under Example 6, it is found that its properties are very much the same as the enamel of that example.

EXAMPLE 8

To 20.6 parts of N,N-diallylmelamine is added 16.2 parts of 37% aqueous formaldehyde, after which the mixture is heated until a clear solution is obtained. To this solution is added 36 parts of the monoglyceride of linseed oil fatty acids, followed by heating of the resulting reaction mass to evaporate the water. A clear mixture is obtained, which is then heated at 150° C. until the resinous reaction product has bodied slightly. The yield amounts to 60 parts. A liquid coating composition is formed by diluting the resinous mass with 40 parts of xylene. To a sample of this coating composition is added 0.04% of metallic cobalt (based on the total resin solids) in the form of cobalt naphthenate. A sample of the composition containing the cobalt drier is flowed onto a glass plate and allowed to air-dry. After standing for about two days at room temperature a dried film forms on the plate. A harder film is produced by drying a similarly coated plate at a temperature of about 105°–120° C. for a period of the order of from 3 to 6 hours.

EXAMPLE 9

Exactly the same procedure is followed as described under Example 8 with the exception that there is used only 8.1 instead of 16.2 parts of aqueous formaldehyde and 18 instead of 36 parts of the monoglyceride of linseed oil fatty acids. In this example the yield amounts to about 40 parts. The liquid resinous composition of this example is diluted with 27 parts of xylene to form a coating composition. When a small amount of cobalt drier is added to a sample of the resin as in Example 8, the resulting composition has properties which are very similar to the corresponding composition of the preceding example.

EXAMPLE 10

To 412 parts of N,N-diallylmelamine is added 162 parts of 37% aqueous formaldehyde, after which the mixture is heated and stirred while passing a stream of carbon dioxide into the reaction mass and simultaneously distilling off water. The reaction mass is heated to a maximum temperature of 150° C. The resulting clear resin is poured into a suitable receptacle for cooling, yielding a brittle resin when cold. The yield amounts to about 442 parts.

EXAMPLE 11

| | Parts |
|---|---|
| Resinous reaction product of Example 10 | 50 |
| Butyl acrylate | 50 | are heated together in a reaction vessel placed on a steam bath until the resin has dissolved. The reaction mixture is then cooled and a small amount, e. g., about 2 or 3% of the mixture, of 2,2'-azo-bis-isobutyronitrile is added thereto. The catalyzed mixture is then heated in a 60° C. oven for about 16 hours, yielding a tough, hard, clear resinous copolymer of butyl acrylate and the N,N-diallylmelamine-formaldehyde reaction product of Example 10.

EXAMPLE 12

| | Parts |
|---|---|
| Resinous reaction product of Example 10 | 50 |
| Homogeneous blend of 1 part of styrene and 2 parts of an unsaturated alkyd resin which is a product of reaction of 6.3 moles diethylene glycol, 5 moles fumaric acid and 1 mole sebacic acid | 50 |

The above ingredients are heated together at 110°–120° C. under an atmosphere of carbon dioxide, yielding a very viscous, homogeneous melt. After adding to this melt a small amount of 2,2'-azo-bis-isobutyronitrile as in Example 11 and heating the resulting mixture at 90° C. for one hour, there is obtained a hard, tough, cross-linked copolymer of the above copolymerizable ingredients.

EXAMPLE 13

A mixture of 100 parts of the resinous reaction product of Example 10 and 75 parts of acetone is heated in a reaction vessel placed on a steam bath until the aforesaid reaction product has dissolved. To the acetone solution is added 100 parts of the same unsaturated alkyd resin employed in the preceding example and 1 part of 2,2'-azo-bis-isobutyronitrile. After mixing thoroughly, the resulting solution is used to impregnate sheets of paper, which are then suspended to air-dry. After drying for 3 hours the dried, impregnated sheets are superimposed, and the resulting assembly is then laminated by pressing for 15 minutes at 105° C. under a pressure of the order of 3,000–5,000 or more lbs. per square inch. The cured laminated article has a Barcol hardness of 25 to 30, and burns with difficulty. After an additional heating period of about 16 hours at 105° C. the Barcol hardness is increased to 45–50.

EXAMPLE 14

| | Parts |
|---|---|
| N,N-diallylmelamine | 1,648 |
| Aqueous formaldehyde (approx. 37% HCHO) | 648 | are heated together for about 43 minutes while passing a stream of carbon dioxide gas into the reaction mass. At the end of this period of time the temperature is 100° C. and the solution is clear and distilling. Heating is continued over a period of about 1½ hours to a maximum temperature of 140° C., during which period approximately 447 parts of water is distilled off. The resinous reaction product, which is obtained in a yield of 1840 parts, is poured into a tray for cooling. The cold resin is brittle but exhibits some cold flow. It has an average molecular weight of about 3920, as calculated from the results of a freezing-point determination made on a benzene solution of a sample of the resin.

EXAMPLE 15

Coating compositions are prepared by mixing together (a) 40 parts of a 50% xylene solution of a castor oil-modified glyceryl phthalate polyester having an acid number of about 6 to 10, and (b) 10 parts of a 50% xylene solution of the resinous N,N-diallylmelamine-formaldehyde reaction product of Example 10. A similar composition is made wherein 0.25 part of 2,2'-azo-bis-isobutyronitrile is added, and another composition of the same kind into which is incorporated 0.01% of cobalt drier (based on the weight of the resin solids) in the form of cobalt naphthenate.

Samples of each of the above compositions are poured onto two sets of tin panels, one set of which is air-dried for about 24 hours and the other is dried by heating in a 100° C. oven for 15 minutes. Good coatings are obtained in all cases.

EXAMPLE 16

To 103 parts of N,N-diallylmelamine is added 40.5 parts of 37% aqueous formaldehyde that previously has been adjusted to a pH of 7.2 with triethanolamine. The resulting mixture is heated to boiling, yielding a clear solution. After heating for an additional period of 10 minutes in a reaction vessel placed on a steam bath, the reaction mass is allowed to cool to room temperature. After standing for about 24 hours, a methylol N,N-diallylmelamine crystallizes from the reaction mass.

EXAMPLE 17

An allylated methylol N,N-diallylmelamine is produced by distilling a mixture of 86.5 parts of N,N-diallylmelamine, 102 parts of 37% aqueous formaldehyde and 150 parts of allyl alcohol at atmospheric pressure. The addition of more allyl alcohol (a total of about 300 parts more is added) is started when distillation commences and is continued over a period of about 2¼ hours to replenish the liquid which distills and thus maintain a constant volume. Heating is continued for about 50 minutes after all of the allyl alcohol has been added, a total of about 450 parts of allyl alcohol and water being distilled off during the reaction time. The maximum vapor temperature attained during the reaction is 96° C. The yield of allylated methylol N,N-diallylmelamine amounts to 184 parts.

EXAMPLE 18

| | Parts |
|---|---|
| Monomethylol N,N-diallylmelamine | 50 |
| Methyl vinyl ketone | 50 |
| Benzoyl peroxide | 1 |

A mixture of the above ingredients is heated for 45 minutes in a reaction vessel placed on a steam bath. The resulting copolymer of methyl vinyl ketone and monomethylol N,N-diallylmelamine is washed with 400 parts of boiling methanol and air-dried. The dried copolymer, which is an amber-colored, rubbery solid, is obtained in a yield of 75 parts. When a sample of this rubbery solid is further cured by heating in an oven at 103° C. for about 16 hours, it is converted into a hard, brittle resin.

EXAMPLE 19

| | Parts |
|---|---|
| Styrene | 15.0 |
| Dimethylol N,N-diallylmelamine | 5.0 |
| Methyl ethyl ketone | 5.0 |
| Acetyl peroxide | 0.1 | are heated together for 16 hours in a reaction vessel placed on a steam bath. The resulting copolymer of dimethylol N,N-diallylmelamine and styrene is washed with 40 parts of boiling methanol and then air-dried. The yield of the dried copolymer, which is a tough, white solid, amounts to 19.8 parts. A harder copolymer is obtained upon heating for about 16 hours in an oven at 103° C.

A sample of the washed and air-dried copolymer is slurried in hot chlorobenzene. The slurry is poured into a Petri dish and the chlorobenzene is evaporated. The film, after drying in an oven at 103° C., is hard and transparent.

EXAMPLE 20

Same as Example 19 with the exception that 5 parts of dimethylol N,N'-diallylmelamine is substituted for 5 parts of dimethylol N,N'-diallylmelamine. The properties of the resulting copolymer are substantially the same as those of the copolymer of Example 19.

EXAMPLE 21

| | Parts |
|---|---|
| Acrylonitrile | 48.5 |
| Dimethylol N,N-diallylmelamine | 1.5 |
| Methyl ethyl ketone | 1.5 |
| Water | 250.0 |
| Ammonium persulfate | 0.5 | are heated together, with stirring, for 1 hour in a reaction vessel placed on a steam bath. The copolymer of acrylonitrile and dimethylol N,N-diallylmelamine that precipitates at the end of this period of time is collected on a Büchner funnel and washed first with 1000 parts of water and then with 200 parts of methanol, after which it is dried in an oven at 70° C. for 3 hours. Forty-seven (47) parts of a dry, white copolymer is obtained.

EXAMPLE 22

Essentially the same conditions and procedure are employed as in Example 21 with the exception that the dimethylol N,N-diallylmelamine is replaced with 1.5 parts of monomethylol N,N-dimethallylmelamine, 1 part instead of 0.5 part of ammonium persulfate is used, and the ingredients are heated together for 3 hours instead of 1 hour in a reaction vessel placed on a steam bath. The resulting copolymer of acrylonitrile and monomethylol N,N-dimethallylmelamine is washed and dried in the same manner as in Example 21. Drying is facilitated by washing with methanol after the water wash.

EXAMPLE 23

Example 21 is repeated but using 1.5 parts of dimethylol N-allyl-N-methylmelamine instead of 1.5 parts of dimethylol N,N-diallylmelamine, and the time of reaction is 2 hours instead of 1 hour. The copolymer of acrylonitrile and dimethylol N-allyl-N-methylmelamine is washed and dried as in Example 21.

EXAMPLE 24

Same as in Example 21 with the exception that, instead of 1.5 parts of dimethylol N,N-diallylmelamine, there is used 2 parts of monomethylol N,N,N'-triallylmelamine; 48 parts instead of 48.5 parts of acrylonitrile; and 3 parts instead of 1.5 parts of methyl ethyl ketone. Similar results are obtained.

EXAMPLE 25

| | Parts |
|---|---|
| Monomethylol N,N-diallylmelamine | 75 |
| Ethyl acrylate | 25 |
| Methyl ethyl ketone | 50 |
| 2,2' - azo - bis - isobutyronitrile ($\alpha,\alpha'$ - azodiisobutyronitrile) | 1 |

A mixture of the above ingredients is heated for 1 hour in a reaction vessel placed on a steam bath. The resulting copolymer of monomethylol N,N-diallylmelamine and ethyl acrylate is washed with 400 parts of boiling methanol and air-dried. One hundred (100) parts of a tough, transparent copolymer is obtained. A sample, cured in an oven at 103° C. for 16 hours, becomes hard and brittle.

EXAMPLE 26

| | Parts |
|---|---|
| Monomethylol N-allyl-N-cyclohexylmelamine | 50 |
| Ethyl acrylate | 50 |
| Methyl ethyl ketone | 50 |
| 2,2'-azo-bis-isobutyronitrile | 1 |

The procedure is exactly the same as in Example 25 with the exception that the heating period is 2 hours. The resulting copolymer of monomethylol N-allyl-N-cyclohexylmelamine and ethyl acrylate, after air-drying, is somewhat softer than the similarly dried copolymer of Example 25.

EXAMPLE 27

Same as in Example 26 with the exception that 25 parts of monomethylol N,N,N',N'-tetrallylmelamine is used in place of 50 parts of monomethylol N-allyl-N-cyclohexylmelamine; 75 parts instead of 50 parts of ethyl acrylate; 2 parts instead of 1 part of 2,2'-azo-bis-isobutyronitrile; and the polymerization period is 1 hour instead of 2 hours. A good yield of a copolymer of ethyl acrylate and monomethylol N,N,N',N'-tetrallylmelamine is obtained.

Similar results are secured when equivalent parts of other alkyl acrylates, specifically methyl or n-propyl acrylate are substituted for ethyl acrylate. Methyl acrylate yields a harder copolymer than n-propyl acrylate.

EXAMPLE 28

Same as Example 25 with the exception that 75 parts of monomethylol N-allyl-N-benzylmelamine is used instead of 75 parts of monomethylol N,N-diallylmelamine. Both the air-dried and oven-cured samples of copolymer of ethyl acrylate and monomethylol N-allyl-N-benzylmelamine are softer than the corresponding products of Example 25. Harder copolymers are obtained when an equivalent amount of allyl acrylate, methallyl acrylate or methyl methacrylate, or mixtures of these comonomers in any proportions, are substituted for the ethyl acrylate.

EXAMPLE 29

| | Parts |
|---|---|
| Methyl vinyl ketone | 50 |
| Dimethylol N,N-diallylmelamine | 25 |
| Diallyl phthalate | 25 |
| Methyl ethyl ketone hydroperoxide | 1 |

The above ingredients are thoroughly mixed together to yield a solution which is then heated for 90 minutes in a reaction vessel placed on a steam bath. The resulting copolymer, specifically tripolymer, of methyl vinyl ketone, diallyl phthalate and dimethylol N,N-diallylmelamine is washed with 400 parts of boiling methanol and is then air-dried. The yield of air-dried, solid copolymer, which can be used in the production of molding compositions, is obtained in a yield amounting to 84 parts. When a sample is heated in an oven at 103° C. for about 16 hours, thereby to advance the cure, a hard, brittle, substantially insoluble and infusible copolymer is obtained.

EXAMPLE 30

Same as Example 29 with the exception that 25 parts of dimethylol N-allyl-N-tolylmelamine is used in place of 25 parts of dimethylol N,N-diallylmelamine, and the polymerization period is 2 hours instead of 90 minutes. Samples of the air-dried and oven-dried copolymer of methyl vinyl ketone, diallyl phthalate and dimethylol N-allyl-N-tolylmelamine are a little softer than the corresponding copolymers of Example 29.

EXAMPLE 31

A reaction vessel, equipped with a stirrer, reflux condenser, thermometer and gas-inlet tube, is placed in a constant-temperature bath which is maintained at 35° C. To the vessel is added a solution of 50.35 parts of acrylonitrile, 2.65 parts of monomethylol N-allyl-N-phenylmelamine, 10 parts of methyl ethyl ketone, 890 parts of distilled water and sulfuric acid in a small amount such that the resulting solution has a pH of about 3.3. A rapid stream of pre-purified nitrogen is passed over the surface of the solution for 30 minutes. The nitrogen flow is then reduced to about one bubble per second. To the vessel is then added 1.71 parts of ammonium persulfate and 0.36 part of sodium bisulfite (meta), each dissolved in 50 parts of water. The polymerization is carried out for 6 hours at 35° C. The resulting copolymer of acrylonitrile and monomethylol N-allyl-N-phenylmelamine is collected on a Büchner funnel, washed with 1000 parts of deionized water and then dried in an oven at 70° C. for about 16 hours. The copolymer has improved dyeability, especially toward acid dyes, e. g., Calcocid Alizarine Blue SAPG (Color Index No. 1054), as compared with homopolymeric acrylonitrile which has been similarly prepared and tested for its dyeability. (See Example 14 of the copending application of Walter M. Thomas, Serial No. 234,468, filed June 29, 1951, for a description of the method of testing for dyeability.)

Similar results are obtained when 47.7 parts of acrylonitrile and 2.65 parts of methyl acrylate are used in place of 50.35 parts of acrylonitrile.

The preparation of reaction products of an aldehyde, specifically formaldehyde, and N,N-diallylmelamine under various conditions of reaction is summarized in Table I—Parts A and B, while properties of the reaction products are given in Table I—Part C. In the last three examples given in this table an aqueous solution of formaldehyde and N,N-diallylmelamine are reacted at reflux (94°–96° C.) in the pH range of 7.4 to 8.7 until the refluxing solution becomes cloudy and turbid, after which the pH is adjusted to 8.1–9.0 and the resin is dehydrated under vacuum to a final temperature of about 140°–143° C. The finished resins produced in this manner are hard and brittle when cold.

Table I.—Part A
N,N-DIALLYLMELAMINE-FORMALDEHYDE REACTION PRODUCTS

| Example No. | F/DAM[1] charged ratio | Charged solids, percent | Slurry, pH | Buffer | Reaction temp., °C. | Reaction, pH | Reaction time, min. | Cloud temp., °C. |
|---|---|---|---|---|---|---|---|---|
| 32 | 12.0 | 47.8 | 9.2 | deea[2] | Reflux[3] | | 310 | >90. |
| 33 | 4.9 | 58.5 | 7.0 | | 80–96 | 7.5 | 18 | >90. |
| 34 | 4.9 | 58.5 | 8.7 | NaOH | 90–93 | 8.3 | 0 | OK 25. |
| 35 | 4.9 | 58.5 | 8.7 | NaOH | 90–93 | 7.8 | 45 | 30. |
| 36 | 4.0 | 61.5 | 9.4 | deea | Reflux | 9.0 | 0 | 25. |
| 37 | 4.0 | 61.5 | 9.4 | deea | do | 9.3 | 120 | 60. |
| 38 | 2.0 | 72 | | NaOH | 90 | | 0 | >75. |
| 39 | 2.0 | 72 | | NaOH | 90 | | 60 | |
| 40 | 2.0 | 72 | | NaOH | 90 | | 0 | >75. |
| 41 | 2.0 | 72 | | NaOH | 90 | | 60 | |
| 42 | 2.0 | 72 | | deea | Reflux | 10.0 | 0 | 46. |
| 43 | 2.0 | 72 | | deea | do | 9.0 | 120 | |
| 44 | 2.0 | 72 | | deea + HCOOH | do | 9.5 | 0 | 65. |
| 45 | 2.0 | 72 | | deea + HCOOH | do | 8.9 | 60 | 80. |
| 46 | 2.0 | 72 | | deea + HCOOH | do | 8.4 | 180 | >80. |
| 47 | 2.0 | 72 | 7.05 | | do | 8.1–7.5 | 22 | Reflux. |
| 48 | 2.0 | 72 | 8.0 | NaOH | do | 8.5 | 45 | Do. |
| 49 | 2.0 | 72 | 7.0 | NaOH | do | 7.4 | 55 | Do. |
| 50 | 2.0 | 72 | 7.5 | NaOH | do | 8.7 | 67 | Do. |

[1] F/DAM designates the molar ratio of formaldehyde to N,N-diallylmelamine.
[2] deea designates diethylaminoethanol.
[3] Reflux=94°–98° C.

Table I.—Part B
N,N-DIALLYLMELAMINE-FORMALDEHYDE REACTION PRODUCTS

| Ex. No. | Conc'n, pH | Conc'n time, min. | Minutes at 140° C. or above | Final temp., °C. | Final vac., cm. Hg | Appearance |
|---|---|---|---|---|---|---|
| 32 | | Partially dried in vacuum oven at 40–50° C. | | | | |
| 33 | | | | | | |
| 34 | | | | | | |
| 35 | | | | | | Crystallized on cooling. |
| 36 | | | | | | |
| 37 | | | | | | 64% Solution in alcohol crystallized. |
| 38 | | 960 | 0 | 45 | 76 | |
| 39 | | 960 | 0 | 45 | 76 | Viscous |
| 40 | | 240 | 0 | 50 | 76 | Do. |
| 41 | | 300 | 0 | 50 | 76 | Do. |
| 42 | | | | | | |
| 43 | | | | | | |
| 44 | 9.5 | 60 | 0 | 40–50 | 76 | Crystallized. |
| 45 | 8.9 | 60 | 0 | 40–50 | 76 | Viscous. |
| 46 | 8.4 | 60 | 0 | 40–50 | 76 | Dry. |
| 47 | | | | | | |
| 48 | 8.5 | 133 | 0 | 140 | 60 | Clear, brittle. |
| 49 | 8.1 | 105 | .50 | 143 | 71 | Do. |
| 50 | 8.9 | 112 | 23 | 142 | 72 | Do. |

Table I.—Part C
PROPERTIES OF N,N-DIALLYMELAMINE-FORMALDEHYDE REACTION PRODUCTS

| Example No. | Caking temp. in H$_2$O, °C. | Dilutability in 2B alc./water at 25° C. | | Storage stability | APHA color [4] | |
|---|---|---|---|---|---|---|
| | | 2B alc. in solvent, percent | Solids at maximum dilution, percent | | Unfiltered | Filtered |
| 32 | | | | | | |
| 33 | | | | | | |
| 34 | | 30 | 0 | | | |
| 35 | | 30 | ([5]) | | | |
| 36 | | 10 | ([5]) | | | |
| 37 | | 90 | ([5]) | | | |
| 38 | | 10 | ([5]) | | | |
| 39 | | | | | | |
| 40 | | 100 | 0 | | 260 U | 176 C |
| 41 | | 10 | ([5]) | | 212 U | 135 C |
| 42 | | 10 | ([5]) | | | |
| | | 100 | 0 | | | |
| 43 | | 45 | 52 | | | |
| | | 100 | 0 | | | |
| 44 | | 20 | ([5]) | | | |
| | | 100 | 0 | | | |
| 45 | | 90 | ([5]) | | | |
| | | 100 | 0 | | | |
| 46 | | 100 | 50 | | | |
| 47 | | | | | | |
| 48 | >30 | 80 | 22 | | 430 U | 170 U |
| | | 100 | 12 | | 200 C | 170 C |
| 49 | 50-52 | 100 | 52 | ([6]) | | |
| 50 | 45-50 | 100 | 37.5 | | | |

[4] U: uncorrected for haze; C: correction factor applied for haze. Values were determined by spectrophotometric analysis.
[5] Two drops of resin solution added to 10–15 ml. of solvent caused turbidity.
[6] No caking >6 weeks at 40° C.

EXAMPLE 51

The cure rate of the resin of Example 49 is checked by baking films of 50/50 alcohol-toluene solvent solutions of the resin at 150° C. for 10, 30 and 60 minutes with various acid catalysts, and observing the so-called "boil resistance" of the films, that is, the resistance of the films to the effect of immersion in boiling water for 30 minutes. The results are summarized in Table II.

Table II
RESULTS OF CURE TESTS ON N,N-DIALLYLMELAMINE-FORMALDEHYDE RESINS

| Percent of catalyst (based on resin solids) | Cure time, minutes at 150° C. for boil resistance | | | |
|---|---|---|---|---|
| | 0 | 1 | 3 | 5 |
| Catalyst: | | | | |
| None | 60 | | | |
| Citric acid | | 30-60 | 10 | 10 |
| Phthalic anhydride | | 10-30 | 10 | 10 |
| Hydrochloric acid (quantity for pH adjustment was not measured) | | (pH 5.9) 10-30 | (pH 5.5) 10-30 | (pH 4.9) 10 |

A faster cure is obtained by eliminating the alcohol in the solvent. For instance, the resin of Example 50 can be dissolved in xylene, and 1, 3 or 5% phthalic anhydride (based on the resin solids) added as a catalyst. Films having good hardness and boil resistance are obtained with these percentages of catalyst and baking periods at 150° C. of 5, 10 and 20 minutes.

Various other catalysts may be added to accelerate the cure of the aldehyde-reaction product, as desired or as conditions may require, among which may be mentioned for illustrative purposes acid or direct catalysts (other than those given in Table II), for instance benzoic acid, salicylic acid, oxalic acid, etc.; latent curing catalysts (catalysts possessing latent acidity), e. g., ammonium chloride, monochloroacetyl urea, monochloroacetamide, o-sulfamidomethylbenzoate, etc.; as well as others. Good cures are usually obtained at a resin pH of about 3 to 6.

As indicated hereinbefore and as further shown by a number of the examples, the properties of the fundamental aldehyde-reaction products of this invention can be varied widely by introducing other modifying bodies before, during or after effecting reaction (partial or substantially complete reaction) between the primary components. Thus, as modifying agents we may use, for instance, monohydric alcohols, e. g., methyl, ethyl, propyl, isopropyl, butyl, hexyl, n-octyl, 2-ethylhexyl, decyl, dodecyl, cetyl, lauryl, capryl or tetrahydrofurfuryl alcohol, pentanol or mixtures of isomeric pentanols (which mixtures also may include n-pentanol), cyclohexanol, methylcyclohexanol, etc.; polyhydric alcohols, e. g., glycerol, pentaerythritol, dipentaerythritol, mannitol, sorbitol, ethylene glycol, diethylene glycol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., cyanamide, dicyandiamide, stearamide, acrylamide, benzamide, phthalamide, benzene sulfonamides, toluene sulfonamides, etc.; amines, e. g., ethylene diamine, phenylene diamine, triethylene tetramine, etc.; ketones, including halogenated ketones, e. g., methyl ethyl ketone, acetone, chloroacetones, etc.; nitriles, including halogenated nitriles and unsaturated nitriles, e. g., acrylonitrile, methacrylonitrile, acetonitrile, chloroacetonitriles, etc.; acylated ureas, including halogenated acylated ureas, e. g., acetyl urea, propionyl urea, chloroacetyl ureas, etc.

Illustrative examples of other modifying bodies that may be incorporated into the aldehyde-reaction products of this invention or into copolymers of such polymerizable products with other unsaturated materials that are copolymerizable therewith include melamine-aldehyde condensation products (e. g., melamine-formaldehyde condensation products), urea-aldehyde condensation products (e. g., urea-formaldehyde condensation products), urea-melamine-aldehyde condensation products (e. g., urea-melamine-formaldehyde condensation products), protein-aldehyde condensation products, aminodiazine-aldehyde condensation products, amino-triazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

In some cases it may be desirable to form a copolymer of the N-substituted melamine of the kind embraced by Formula I and another unsaturated material which is copolymerizable therewith, examples of which have been given hereinbefore, and then to react the resulting copolymer with an aldehyde, e. g., formaldehyde.

Coating compositions may be prepared from the thermosetting or potentially thermosetting resinous compositions of this invention alone or admixed with, for example, melamine-formaldehyde resins, urea-formaldehyde resins, fatty oil or fatty oil-acid modified alkyd resins, or other film-forming materials commonly used in protective-coating or decorative-surfacing compositions.

Dyes, pigments, driers, curing agents, plasticizers, mold lubricants, opacifiers and various fillers (e. g., wood flour, glass fibers, asbestos, mineral wool, mica dust, powdered quartz, titanium dioxide, talc, China clay, carbon black, etc.) may be compounded by conventional practice with our resinous materials, including those compositions which comprise a soluble, polymerizable, partial condensation product of an aldehyde, e. g., formaldehyde, and a compound of the kind embraced by Formula I, e. g., N,N-diallylmelamine, with or without one or more other unsaturated materials which are copolymerizable therewith, thereby to secure a coating, molding or other composition best adapted for a particular use.

The modified or unmodified synthetic materials, more particularly resinous compositions, of this invention have a wide variety of uses in addition to coating, molding and other applications. The soluble resins of our invention have a very wide range of solubility in organic solvents, including alcohols, ketones, esters, aromatic hydrocarbons and mineral spirits, and in solution state can be used as laminating varnishes in the production of laminated articles wherein sheet materials, e. g., paper, cloth, sheet asbestos, glass cloth, etc., are coated or coated and impregnated with the resin solution, superimposed and thereafter united under heat and pressure. They also may be employed as an adhesive in making plywood, as an impregnant of pulp pre-forms (a use that previously has been mentioned and for which certain products of this invention are especially suited), in electrical insulating and impregnating applications, for bonding together abrasive grains in the production of resin-bonded abrasive articles such, for instance, as grindstones, sandpapers, etc., in the manufacture of electrical resistors, etc. They also may be used for treating textile materials (e. g., cotton, linen, rayon and other cellulose-containing textiles, wool, silk or other natural or synthetic proteinaceous textiles, including nylon and textiles derived from soya beans, etc., polyacrylonitrile fibers and textiles produced therefrom, in order to improve the properties of such textile materials and to make them more serviceable or useful.

For additional details on the preparation of certain of the resins mentioned hereinbefore, more particularly reaction products of an aldehyde, specifically formaldehyde, and N,N-diallylmelamine, and uses of such reaction products, reference is made to the copending applications of Richard Lindenfelser and Martha Kilthau, Serial No. 102,948, filed July 2, 1949, and now abandoned, Serial No. 140,564, filed January 25, 1950, and which was abandoned in favor of copending application Serial No. 362,677, filed June 18, 1953, as a continuation-in-part of said application Serial No. 140,564; Serial No. 183,098, filed September 2, 1950, and which was abandoned in favor of copending application Serial No. 472,506, filed December 1, 1954, as a continuation-in-part of said application Serial No. 183,098; and Serial No. 203,564, filed December 29, 1950, now abandoned, as a division of said application Serial No. 102,948.

We claim:

1. A composition comprising a copolymer of copolymerizable ingredients including a methylol N,N-diallylmelamine and methylisobutylcarbinyl acrylate.

2. A polymerizable composition comprising a dimethylol N,N-diallylmelamine and methylisobutylcarbinyl acrylate.

3. A copolymer of copolymerizable ingredients including a dimethylol N,N-diallylmelamine and methylisobutylcarbinyl acrylate.

4. A composition comprising a copolymer of copolymerizable ingredients including a methylol N,N-diallylmelamine and an organic ester of acrylic acid.

5. A composition comprising a copolymer of copolymerizable ingredients including a dimethylol N,N-diallylmelamine and an organic ester of acrylic acid.

6. A method of preparing a new synthetic composition which comprises polymerizing, with the aid of a polymerization catalyst, a mixture of copolymerizable ingredients including a methylol N,N-diallylmelamine and methylisobutylcarbinyl acrylate.

References Cited in the file of this patent

UNITED STATES PATENTS

| | | |
|---|---|---|
| 2,197,357 | Widmer et al. | Apr. 16, 1940 |
| 2,328,425 | D'Alelio | Aug. 31, 1943 |
| 2,361,823 | D'Alelio | Oct. 31, 1944 |
| 2,368,451 | D'Alelio | Jan. 30, 1945 |
| 2,430,708 | D'Alelio | Nov. 11, 1947 |
| 2,567,847 | Kaiser | Sept. 11, 1951 |
| 2,712,004 | Thomas | June 28, 1955 |

OTHER REFERENCES

Cyanamid New Product Bulletin No. 26, March 1951, 12 pages of which pages 6–12 are of interest. American Cyanamid Company, New York, N. Y.